US010844203B2

(12) United States Patent
Chang et al.

(10) Patent No.: US 10,844,203 B2
(45) Date of Patent: Nov. 24, 2020

(54) POLYETHYLENE COMPOSITIONS, AND ARTICLES MADE THEREFROM

(71) Applicant: Dow Global Technologies LLC, Midland, MI (US)

(72) Inventors: Dane Chang, Sugar Land, TX (US); Siddharth Ram Athreya, Houston, TX (US); Ronald Wevers, Gravenpolder (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/321,319

(22) PCT Filed: Jul. 26, 2017

(86) PCT No.: PCT/US2017/043838

§ 371 (c)(1),
(2) Date: Jan. 28, 2019

(87) PCT Pub. No.: WO2018/057107

PCT Pub. Date: Mar. 29, 2018

(65) Prior Publication Data

US 2019/0161602 A1 May 30, 2019

Related U.S. Application Data

(60) Provisional application No. 62/398,121, filed on Sep. 22, 2016.

(51) Int. Cl.

| | |
|---|---|
| ***C08L 23/06*** | (2006.01) |
| ***C08L 23/08*** | (2006.01) |
| ***C08L 27/12*** | (2006.01) |
| *C08L 53/00* | (2006.01) |

(52) U.S. Cl.

CPC .......... *C08L 23/0815* (2013.01); *C08L 23/06* (2013.01); *C08L 27/12* (2013.01); *C08L 53/00* (2013.01); *C08L 2203/18* (2013.01); *C08L 2205/025* (2013.01); *C08L 2205/03* (2013.01); *C08L 2205/035* (2013.01); *C08L 2207/062* (2013.01); *C08L 2207/064* (2013.01); *C08L 2207/068* (2013.01)

(58) Field of Classification Search

CPC .......... C08L 23/16; C08L 23/06; C08L 27/12; C08L 53/00; C08L 23/0815; C08L 2205/03; C08L 2207/062; C08L 2207/04; C08L 2205/025; C08L 2203/18; C08L 53/025; C08L 23/04; C08L 2207/068; C08L 2207/064; C09D 123/16; C09D 123/06

See application file for complete search history.

(56) References Cited

U.S. PATENT DOCUMENTS

| | | | |
|---|---|---|---|
| 6,479,003 | B1 | 11/2002 | Furgiuele et al. |
| 9,296,882 | B2 | 3/2016 | Brunner et al. |
| 2006/0199930 | A1 | 9/2006 | Li Pi Shan et al. |
| 2008/0051515 | A1 | 2/2008 | Dudek |
| 2015/0065616 | A1 | 3/2015 | Brunner et al. |
| 2017/0096551 | A1 | 4/2017 | Chang et al. |

FOREIGN PATENT DOCUMENTS

| | | | |
|---|---|---|---|
| EP | 2907829 | A1 | 8/2015 |
| EP | 2907843 | A1 | 8/2015 |
| WO | 2014059419 | A1 | 4/2014 |
| WO | 2014095911 | A1 | 6/2014 |
| WO | 2014095917 | A1 | 6/2014 |
| WO | 2014177547 | A1 | 11/2014 |

OTHER PUBLICATIONS

Brunner, "Ultra-high Wear Resistant Polyethylenes," Doctoral Thesis ETH Zurich Research Collection. Zurich, 2006, p. 1-147.
PI, Ind. Eng. Chem. Res., 2014, vol. 53, p. 13828?13832.
Keum, Macromolecules, 2008, vol. 41, p. 4766-4776.
Diop, Polymer, 2014, vol. 55, p. 4948-4958.
Tincer, Polymer Engineering and Science, 1993, vol. 33, No. 19, p. 1243-1250.
Shen, Polymer Engineering and Science, 2015, vol. 55, No. 2, 270-276.
Ushakova, J. Appl. Polym. Sci., 2014, vol. 131, No. 8, App. 40151, p. 1-8.
Vadhar, Polymer Engineering and Science, 1987, vol. 27, No. 3, p. 202-210.
PCT/US2017/043838, International Search Report and Written Opinion with dated Oct. 10, 2017.
PCT/US2017/043838, International Preliminary Report on Patentability dated Apr. 4, 2019.

*Primary Examiner* — Nathan M Nutter

(57) ABSTRACT

The invention provides a composition suitable for use in pipe applications, the composition comprising: an ultra-high molecular weight ethylene-based polymer having an intrinsic viscosity from 5 to 50 deciliters/gram; a polyethylene resin comprising a first molecular weight ethylene-based polymer component and a second molecular weight ethylene-based polymer component, wherein the polyethylene resin has a density from 0.930 to 0.960 g/cc; a thermoplastic polyolefin elastomer having a density of from 0.850 to 0.910 g/cc; and, optionally, a fluoropolymer.

12 Claims, No Drawings

POLYETHYLENE COMPOSITIONS, AND ARTICLES MADE THEREFROM

TECHNICAL FIELD

Embodiments of the present disclosure generally relate to polyethylene compositions and applications of the polyethylene compositions to make shaped articles, such as, for example, pipes.

BACKGROUND

Pipes manufactured from polyolefins, for example, PE resins, are relatively light in weight, easy to handle, and are non-corrosive. Existing polyolefin pipes can provide a relatively high rigidity, allowing them to be laid under the ground, and a relatively high flexibility so that they can adapt to the movement of ground. However, existing pipes used to transport slurry or other abrasive particulate streams can be subjected to a high degree of wear. In some applications, existing pipes may not be adequate to handle the transport of slurry or abrasive particulate streams. For example, HDPE pipes may not be capable of transporting gritty water-based slurries, such as mining slurries, petroleum-based slurries, and/or solvent-based slurries. Accordingly, these transport applications may require the use of either pipes having high abrasion resistance or pipes with a high abrasion resistant inside liner.

Pipes may also be used in high temperature applications, where the pipes transport high temperature materials and/or are subjected to environmental conditions that can cause pipes to have premature mechanical failures. Existing pipes may not be adequate to transport such slurries or other abrasive particulate streams at elevated temperature, such as, for example, above 60° C. (140° F.). Material selection can be critical not only to provide the desired chemical and mechanical properties, but to also provide good abrasive and thermal properties, as well as good processability in manufacturing pipe.

Accordingly, alternative polyethylene compositions having good abrasive and thermal properties, as well as good processability, are desired.

SUMMARY

Disclosed in embodiments herein are compositions suitable for use in pipe applications. The compositions comprise an ultra-high molecular weight ethylene-based polymer having an intrinsic viscosity from 5 to 50 deciliters/gram; a polyethylene resin comprising a first molecular weight ethylene-based polymer component and a second molecular weight ethylene-based polymer component, wherein the polyethylene resin has a density from 0.930 to 0.960 g/cc; a thermoplastic polyolefin elastomer having a density of from 0.850 to 0.910 g/cc; and, optionally, a fluoropolymer. Also disclosed herein are shaped articles comprising at least one component formed from such compositions.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter.

DETAILED DESCRIPTION

Reference will now be made in detail to embodiments of compositions comprising an ultra-high molecular weight ethylene-based polymer, a polyethylene resin, a thermoplastic polyolefin elastomer, and optionally, a fluoropolymer. The compositions described herein are suitable for use in pipe applications. It is noted, however, that this is merely an illustrative implementation of the embodiments disclosed herein. The embodiments are applicable to other technologies that are susceptible to similar problems as those discussed above. For example, the compositions described herein may be used in pipe coatings, drip irrigation tape and tubing, films, sheets, tapes, fibers, caps and closures, and molded articles by molding processes, including blow molding, compression molding, and injection molding (for example, the injection molding of pipe fittings), all of which are within the purview of the present embodiments.

The compositions described herein may comprise from 30 to 60 wt. % of the ultra-high molecular weight ethylene-based polymer. All individual values and subranges of 30 to 60 wt. % are included and disclosed herein. For example, the composition may comprise from a lower limit of 30, 35, 40, 45, or 50 wt. % to an upper limit of 60, 55, 50, 45, or 40 wt. % of the ultra-high molecular weight ethylene-based polymer. In some embodiments, the composition comprises from 30 to 55 wt. %, 35 to 55 wt. %, or 35 to 50 wt. % of the ultra-high molecular weight ethylene-based polymer. In addition to the amount of ultra-high molecular weight ethylene- based polymer, the compositions may further comprise from 10-40 wt. % of the polyethylene resin. All individual values and subranges of 10-40 wt. % are included and disclosed herein. For example, the composition may comprise from a lower limit of 10, 15, 20, 25, 30, or 35 wt. % to an upper limit of 40, 35, 30, 25, 20 wt. % of the polyethylene resin. In some embodiments, the composition comprises from 10 to 35 wt. %, 15 to 35 wt. %, or 15 to 30 wt. % of the polyethylene resin. In addition to the amounts of ultra-high molecular weight ethylene-based polymer and polyethylene resin, the compositions may further comprise from 10 to 40 wt. % of the thermoplastic polyolefin elastomer. All individual values and subranges of 10-40 wt. % are included and disclosed herein. For example, the composition may comprise from a lower limit of 10, 15, 18, 20, 25, 30, or 35 wt. % to an upper limit of 40, 35, 30, 25, 20 wt. % of the thermoplastic polyolefin elastomer. In some embodiments, the composition comprises from 15 to 40 wt. %, 18 to 40 wt. %, or 18 to 35 wt. % of the thermoplastic polyolefin elastomer. The amounts of ultra-high molecular weight ethylene-based polymer, polyethylene resin, and thermoplastic polyolefin elastomer may add up to 100 wt. %, which does not include minor amounts (10 wt. % or less) of additives.

Ultra-High Molecular Weight Ethylene-Based Polymer

The ultra-high molecular weight ethylene-based polymers described herein may be a polyethylene homopolymer or ethylene/alpha-olefin copolymer, each having an ultra-high molecular weight. The ultra-high molecular weight ethylene-based polymer has a higher molecular weight than the first molecular weight ethylene-based polymer component, second molecular weight ethylene-based polymer component, and/or the polyethylene resin as further described herein. This may be indicated by melt index ($I_2$), high load melt index ($I_{21}$), a viscosity measurement (e.g., intrinsic or melt viscosity), and/or GPC. Suitable copolymers may include alpha-olefins having 3 to 10 carbon atoms or, in some embodiments, 3 to 5 carbon atoms. In some embodiments, the ethylene/alpha-olefin copolymer may comprise up to about 5 mol. % of the alpha-olefin comonomer, up to about 2 mol. %, of the alpha-olefin comonomer, or up to about 1 mol. % of the alpha-olefin comonomer. Suitable ultra-high molecular weight ethylene-based polymers may include, but is not limited to, the GUR® 4050 polymer available from Ticona Engineering Polymers, and the UTEC® 6540 or 6541 polymers available from Braskem.

In embodiments herein, the ultra-high molecular weight ethylene-based polymer has an intrinsic viscosity of from 5 to 50 deciliters/gram. All individual values and subranges of from 5 to 50 deciliters/gram are disclosed and included herein. For example, the ultra-high molecular weight ethylene-based polymer may have an intrinsic viscosity ranging from a lower limit of 5, 7, 10, 12, 15, or 20 deciliters/gram to an upper limit of 50, 45, 40, 35, 30, or 25 deciliters/gram. In some embodiments, the ultra-high molecular weight ethylene-based polymer has an intrinsic viscosity of from 5 to 50 deciliters/gram, 5 to 40 deciliters/gram, 7 to 40 deciliters/gram, or 10 to 30 deciliters/gram. The intrinsic viscosity may be determined in accordance with ASTM D 4020.

In embodiments herein, the ultra-high molecular weight ethylene-based polymer has an average particle size, D50, from 100-220 micrometers. All values and subranges are included herein. For example, in some embodiments, the ultra-high molecular weight ethylene-based polymer has an average particle size, D50, from 180-220 micrometers. In other embodiments, the ultra-high molecular weight ethylene-based polymer has an average particle size, D50, from 120-140 micrometers. The average particle size may be determined in accordance with ASTM D1921.

In embodiments herein, the ultra-high molecular weight ethylene-based polymer has a melt temperature from 125 to 140° C. All values and subranges are included herein. For example, in some embodiments, the ultra-high molecular weight ethylene-based polymer has a melt temperature from 125 to 140° C. In other embodiments, the ultra-high molecular weight ethylene-based polymer has a melt temperature from 128 to 138° C. In further embodiments, the ultra-high molecular weight ethylene-based polymer has a melt temperature of 130 to 135° C. The melt temperature may be determined using differential scanning calorimetry (DSC) in accordance with ASTM D3418.

In embodiments herein, the ultra-high molecular weight ethylene-based polymer may have a weight average molecular weight greater than or equal to 1,000,000 g/mole. In some embodiments, the ultra-high molecular weight ethylene-based polymer may have a weight average molecular weight greater than or equal to 2,000,000 or greater than or equal to 3,000,000 g/mole. In other embodiments, the ultra-high molecular weight ethylene-based polymer may have a weight average molecular weight greater than or equal to 1,000,000 g/mole and less than or equal to 10,000,000 g/mole, greater than or equal to 2,000,000 g/mole and less than or equal to 10,000,000 g/mole, greater than or equal to 3,000,000 g/mole and less than or equal to 9,000,000 g/mole, or greater than or equal to 3,000,000 g/mole and less than or equal to 8,000,000 g/mole. The weight average molecular weight may be determined by GPC or light scattering.

In embodiments herein, the ultra-high molecular weight ethylene-based polymer may have a density from 0.915 to 0.950 g/cc. All values and subranges are included herein. For example, in some embodiments, the ultra-high molecular weight ethylene-based polymer may have a density from 0.920 to 0.945 g/cc, from 0.920 to 0.940 g/cc, from 0.920 to 0.935 g/cc, from 0.920 to 0.930 g/cc, or from 0.921 to 0.928 g/cc. The density may be determined in accordance with ASTM D792.

Polyethylene Resin

The polyethylene resin comprises a first molecular weight ethylene-based polymer component and a second molecular weight ethylene-based polymer component. As used herein, "ethylene-based polymer" refers to a polymer that comprises, in polymerized form, a majority weight percent ethylene (based on the total amount of polymerizable monomers), and, optionally, one or more additional comonomers different from ethylene. For example, when the ethylene-based polymer is a copolymer, the amount of ethylene is greater than 50 wt. %, based on the total weight of the copolymer. The polyethylene resin may comprise a combination of two or more embodiments as described herein.

In embodiments herein, the first molecular weight ethylene-based polymer component of the polyethylene resin may be an ethylene-based interpolymer, ethylene/α-olefin interpolymer, homogeneously branched ethylene-based interpolymer or copolymer, or a heterogeneously branched ethylene-based interpolymer or copolymer. Homogeneously branched interpolymers may be produced, for example, by single-site catalyst systems, and contain a substantially homogeneous distribution of comonomer among the molecules of the interpolymer. Heterogeneously branched interpolymers may typically be produced by Ziegler-Natta type catalysts, and contain a non-homogeneous distribution of comonomer among the molecules of the interpolymer. The comonomer may be an α-olefin. In some embodiments, the first molecular weight ethylene-based polymer component is an ethylene/α-olefin interpolymer, and further an ethylene/α-olefin copolymer. In other embodiments, the first molecular weight ethylene-based polymer component is an ethylene/1-hexene copolymer. Trace amounts of impurities, for example, catalyst residues, may be incorporated into and/or within a polymer.

As used herein, "interpolymer" refers to polymers prepared by the polymerization of at least two different types of monomers. The term "interpolymer" can include copolymers, which is used to refer to polymers prepared from two different types of monomers, and polymers prepared from more than two different types of monomers. As used herein, the term "ethylene-based interpolymer" refers to an interpolymer that comprises, in polymerized form, a majority weight percent ethylene (based on the weight of interpolymer), and one or more additional comonomers. The term "ethylene/α-olefin interpolymer" refers to an ethylene-based polymer that comprises, in polymerized form, a majority weight percent ethylene (based on the weight of interpolymer), an α-olefin comonomer, and optionally, one or more additional comonomers.

Suitable α-olefins may include those containing 3 to 20 carbon atoms (C3-C20). In some embodiments, the α-olefin may be a C4-C20 α-olefin, a C4-C12 α-olefin, a C3-C10 α-olefin, a C3-C8 α-olefin, a C4-C8 α-olefin, or a C6-C8 α-olefin. In some embodiments, α-olefins are selected from the group consisting of propylene, 1-butene, 1-pentene, 1-hexene, 4-methyl-1-pentene, 1-heptene, 1-octene, 1-nonene and 1-decene. In other embodiments, α-olefins are selected from the group consisting of propylene, 1-butene, 1-hexene, and 1-octene. In further embodiments, α-olefins are selected from the group consisting of 1-hexene and 1-octene. In even further embodiments, the α-olefin is 1-hexene.

Exemplary ethylene/α-olefin interpolymers may include, but are not limited to, ethylene/butene-1 (EB) copolymers, ethylene/hexene-1 (EH) copolymers, ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. In some embodiments, the ethylene/α-olefin interpolymers are selected from the group consisting of EB, EH and EO copolymers. In other embodiments, the ethylene/α-olefin interpolymers are selected from the group consisting of EH and EO copolymers. In further embodiments, the ethylene/α-olefin interpolymer is EH.

In embodiments herein, the density of the first molecular weight ethylene-based polymer component is from 0.910 to 0.940 g/cc. All individual values and subranges of 0.910 to 0.940 g/cc are included and disclosed herein. For example, in some embodiments, the density of the first molecular weight ethylene-based polymer component is from 0.915 to 0.940 g/cc. In other embodiments, the density of the first molecular weight ethylene-based polymer component is from 0.920 to 0.940 g/cc. In further embodiments, the density of the first molecular weight ethylene-based polymer component is from 0.920 to 0.935 g/cc. Densities disclosed herein for ethylene-based polymers are determined according to ASTM D-792.

In embodiments herein, the first molecular weight ethylene-based polymer component has a weight average molecular weight (Mw) of greater than 50,000 g/mole to less than or equal to 450,000 g/mole. All individual values and subranges of greater than 50,000 g/mole to less than or equal to 450,000 g/mole are included and disclosed herein. For example, in some embodiments, the first molecular weight ethylene-based polymer component may have a weight average molecular weight (Mw) of greater than or equal to 100,000 g/mole to less than or equal to 400,000 g/mole. In other embodiments, the first molecular weight ethylene-based polymer component may have a weight average molecular weight (Mw) of greater than 200,000 g/mole to less than or equal to 400,000 g/mole. In further embodiments, the first molecular weight ethylene-based polymer component may have a weight average molecular weight (Mw) of greater than 300,000 g/mole to less than or equal to 400,000 g/mole. The molecular weight may be determined by either Gel Permeation Chromatography (GPC) or light scattering according to the Standard Test Method ASTM D-4001-93 (1999).

In embodiments herein, the first molecular weight ethylene-based polymer component has a molecular weight distribution (MWD) of 4.0 to 8.0. All individual values and subranges of 4.0 to 8.0 are included and disclosed herein. For example, in some embodiments, the first molecular weight ethylene-based polymer component may have a MWD of 4.5 to 7.5, 4.5 to 6.5, or 4.8 to 6.0. As used herein, MWD refers to the ratio of weight average molecular weight (Mw) to number average molecular weight (Mn), that is, (Mw/Mn). The MWD may be determined by gel permeation chromatography (GPC), as discussed above.

In embodiments herein, the first molecular weight ethylene-based polymer component differs from the second molecular weight ethylene-based polymer component in one or more properties, such as, for example, melt index ($I_2$), high load melt index ($I_{21}$), density, number average molecular weight (Mn), weight average molecular weight (Mw), and/or MWD. In some embodiments, the first molecular weight ethylene-based polymer component may have a significantly higher weight average molecular weight than the second molecular weight ethylene-based polymer component. The difference in the weight average molecular weights is reflected in the melt indices. Accordingly, the high load melt index, $I_{21}$ (190° C., 21.6 kg weight) of the first molecular ethylene-based polymer is 0.05 to 1.2 g/10 min. All individual values and subranges of 0.05 to 1.2 g/10 min are included and disclosed herein. For example, in some embodiments, the high load melt index, $I_{21}$ of the first molecular ethylene-based polymer is 0.10 to 1.0 g/10 min. In other embodiments, the high load melt index, $I_{21}$ of the first molecular ethylene-based polymer is 0.10 to 0.80 g/10 min. In further embodiments, the high load melt index, $I_{21}$ of the first molecular ethylene-based polymer is 0.20 to 0.60 g/10 min.

In embodiments herein, the second molecular weight ethylene-based polymer component may be an ethylene homopolymer, an ethylene-based interpolymer, ethylene-based copolymer, ethylene/α-olefin interpolymer, or a heterogeneously branched ethylene-based interpolymer or copolymer. The comonomer may be an α-olefin as described herein. In some embodiments, the second molecular weight ethylene-based polymer component is an ethylene-based interpolymer. In other embodiments, the second molecular weight ethylene-based polymer component is ethylene/1-hexene copolymer. In other embodiments, the second molecular weight ethylene-based polymer component is a polyethylene homopolymer. In further embodiments, the second molecular weight ethylene-based polymer component is a mixture of a polyethylene homopolymer and an ethylene/α-olefin interpolymer.

The second molecular weight ethylene-based polymer component may have a weight average molecular weight (Mw) of less than 50,000 g/mole. All individual values and subranges of less than 50,000 g/mole are included and disclosed herein. For example, in some embodiments, the second molecular weight ethylene-based polymer component may have a weight average molecular weight (Mw) of less than or equal to 45,000 g/mole or less than or equal to 40,000 g/mole. In other embodiments, the second molecular weight ethylene-based polymer component may have a weight average molecular weight (Mw) of greater than or equal to 1,000 g/mole, greater than or equal to 10,000 g/mole, or greater than or equal to 15,000 g/mole to less than or equal to 50,000 g/mole, less than or equal to 45,000 g/mole, or less than or equal to 40,000 g/mole.

In embodiments herein, the density of the second molecular weight ethylene-based polymer component is from 0.950 to 0.990 g/cc. All individual values and subranges of 0.950 to 0.990 g/cc are included and disclosed herein. For example, in some embodiments, the density of the second molecular weight ethylene-based polymer component is from 0.955 to 0.985 g/cc. In other embodiments, the density of the second molecular weight ethylene-based polymer component is from 0.960 to 0.980 g/cc. In further embodiments, the density of the second molecular weight ethylene-based polymer component is from 0.965 to 0.978 g/cc. The density of the second molecular weight ethylene-based polymer component may be determined from the following equation:

$$\frac{1}{\text{Density }(PE)} = \frac{\text{Weight Fraction }(A)}{\text{Density }(A)} + \frac{\text{Weight Fraction }(B)}{\text{Density }(B)} \quad \text{(I)}$$

wherein "A" is the first molecular weight ethylene-based polymer component, "B" is the second molecular weight ethylene-based polymer component, and "PE" is the polyethylene resin.

In embodiments herein, the polyethylene resin has a density from 0.930 g/cc to 0.960 g/cc. All individual values and subranges of from 0.930 g/cc to 0.960 g/cc are included and disclosed herein. For example, the polyethylene resin may have a density ranging from a lower limit of 0.930, 0.935, 0.940, or 0.945 g/cc to an upper limit of 0.960, 0.955, 0.950, or 0.945 g/cc. In some embodiments, the polyethylene resin has a density of 0.935 to 0.960 g/cc, 0.940 to 0.960 g/cc, 0.945 to 0.960 g/cc, 0.945 to 0.955 g/cc, or 0.945 to 0.950 g/cc.

In embodiments herein, the polyethylene resin has a melt index ($I_2$) of from 0.03 to 2.0 g/10 min. All individual values and subranges of 0.03 to 2.0 g/10 min are included and disclosed herein. For example, the polyethylene resin may have a melt index ($I_2$) ranging from a lower limit of 0.03, 0.04, 0.05, 0.07, 0.10, 0.15, or 0.20 g/10 min to an upper limit of 2.0, 1.8, 1.5, 1.2, 1.0, 0.9, 0.8, or 0.5 g/10 min. In some embodiments, the polyethylene resin has a melt index ($I_2$) from 0.03 to 2.0 g/10 min, from 0.03 to 1.8 g/10 min, from 0.03 to 1.5 g/10 min, or from 0.05 to 1.0 g/10 min.

In embodiments herein, the polyethylene resin has a high load melt index ($I_{21}$) of from 1 to 20 g/10 min. All individual values and subranges of 1 to 20 g/10 min are included and disclosed herein. For example, the polyethylene resin may have a high load melt index ($I_{21}$) ranging from a lower limit of 1, 2, 3, 4, 5, 7, 10, 12, or 15 g/10 min to an upper limit of 20, 18, 15, 12, 10, 8, or 5 g/10 min. In some embodiments, the polyethylene resin has a high load melt index ($I_{21}$) from 1 to 20 g/10 min, from 2 to 15 g/10 min, from 3 to 12 g/10 min, or from 4 to 10 g/10 min.

In embodiments herein, the polyethylene resin has a MWD of 5 to 30. All individual values and subranges of 5 to 30 are included and disclosed herein. For example, in some embodiments, the polyethylene resin may have a MWD of 8 to 27. As used herein, MWD refers to the ratio of weight average molecular weight (Mw) to number average molecular weight (Mn), that is, (Mw/Mn). The MWD may be determined by gel permeation chromatography (GPC).

The polyethylene resin may comprise any amount of the first molecular weight ethylene-based polymer component or the second molecular weight ethylene-based polymer component. In some embodiments, either component can be present, independently, in amounts of 0.5% to 99.5%, by weight of the polyethylene resin. All individual values and subranges of 0.5% to 99.5% are included and disclosed herein. For example, in some embodiments, the polyethylene resin comprises 30% to 70%, by weight of the polyethylene resin, 35% to 65%, by weight of the polyethylene resin, or 40% to 60%, by weight of the polyethylene resin, of the first molecular weight ethylene-based polymer component. In other embodiments, the polyethylene resin comprises 30% to 70%, by weight of the polyethylene resin, 35% to 65%, by weight of the polyethylene resin, or 40% to 60%, by weight of the polyethylene resin, of the second molecular weight ethylene-based polymer component. In further embodiments, the weight ratio of the first molecular weight ethylene-based polymer component to the second molecular weight ethylene-based polymer is from 0.4 to 2.3. In even further embodiments, the weight ratio of the first molecular weight ethylene-based polymer component to the second molecular weight ethylene-based polymer is from 0.6 to 2.0. In even further embodiments, the weight ratio of the first molecular weight ethylene-based polymer component to the second molecular weight ethylene-based polymer is from 0.8 to 1.5.

In embodiments herein, the polyethylene resin can be made by a variety of methods. For example, it may be made by blending or mixing the first molecular weight ethylene-based polymer component and the second molecular weight ethylene-based polymer component together. Alternatively, the polyethylene resin may be made in a single reactor or a multiple reactor configuration, where the multiple reactors may be arranged in series or parallel, and where each polymerization takes place in solution, in slurry, or in the gas phase. In some embodiments, a dual reactor configuration is used where the polymer made in the first reactor can be either the first molecular weight ethylene-based polymer component or the second molecular weight ethylene-based polymer component. The polymer made in the second reactor may have a density and melt flow rate such that the overall density and melt flow rate of the polyethylene resin are met. In some embodiments, the first molecular weight ethylene-based polymer component is made in the first reactor, and the second molecular weight ethylene-based polymer component is made in the second reactor. Similar polymerization processes are described in, for example, WO 2004/101674A, which is incorporated herein by reference.

In some embodiments, the polyethylene resin is manufactured using at least one Ziegler-Natta catalyst system, either alone, or in combination with a single site catalyst. In other embodiments, the polyethylene resin is manufactured using multiple reactors in series with a Z-N catalyst being fed to either each reactor or to just the first reactor. In further embodiments, the Z-N catalyst system may be fed into one or two independently-controlled reactors configured sequentially, and operated in solution, slurry or gas phase. Sequential polymerization may be conducted such that fresh catalyst is injected into one reactor, and substantially little active catalyst is carried over from the first reactor into the second reactor. The resulting polyethylene resin may be characterized as comprising component polymers, each having distinct, unimodal molecular weight distributions. As used herein, "distinct," when used in reference to the molecular weight distribution of the first molecular weight ethylene-based polymer component and the second molecular weight ethylene-based polymer component means there are two corresponding molecular weight distributions in the resulting GPC curve of the polyethylene resin. As used herein, "unimodal," when used in reference to the molecular weight distribution of a component polymer of the polyethylene resin means the molecular weight distribution in a GPC curve of the component polymer does not substantially exhibit multiple component polymers.

Thermoplastic Polyolefin Elastomer

The thermoplastic polyolefin elastomer (TPE) is a polyolefin that (1) has the properties of an elastomer, i.e., the ability to be stretched beyond its original length and retract to substantially its original length when released, and (2) can be processed like a thermoplastic, i.e., to soften when exposed to heat and return to substantially its original condition when cooled to room temperature. In embodiments herein, the TPE has a density of from 0.850 to 0.910 g/cc. All individual values and subranges are included and disclosed herein. For example, the TPE may have a density ranging from a lower limit of 0.850, 0.852, 0.855, 0.860, 0.862, 0.865, 0.870, 0.875, or 0.880 g/cc to an upper limit of 0.910, 0.908, 0.905, 0.902, 0.900, 0.898, 0.895, 0.890, 0.885, or 0.880 g/cc. In some embodiments, the TPE has a density of from 0.852 to 0.910 g/cc, 0.855 to 0.900 g/cc, or 0.855 to 0.895 g/cc.

In exemplary embodiments of the composition of the present disclosure, the TPE component includes ethylene/α-olefin interpolymers and/or ethylene/α-olefin multi-block interpolymers. Suitable ethylene/α-olefin interpolymers may include the ENGAGE™ and AFFINITY™ elastomers and plastomers, available from The Dow Chemical Company (Midland, Mich.) and suitable ethylene/α-olefin multi-block interpolymers (OBCs) may include the INFUSE™ resins, available from The Dow Chemical Company, (Midland, Mich.).

Ethylene/Alpha-Olefin Interpolymer

The ethylene/α-olefin interpolymers are copolymers of ethylene with at least one $C_3$-$C_{20}$ α-olefin. Examples of suitable comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. In some embodiments, the comonomer is 1-Butene or 1-octene. The ethylene/α-olefin interpolymers have at greater than 50% based on the total amount of polymerizable monomers of ethylene.

The ethylene/α-olefin interpolymer may be a homogeneously branched linear or homogeneously branched substantially linear ethylene/α-olefin interpolymer. Processes for preparing homogeneous polymers are disclosed in U.S. Pat. Nos. 5,206,075; 5,241,031; and PCT International Application WO 93/03093; each of which is incorporated, herein, by reference in its entirety. Further details regarding the production of homogeneous ethylene α-olefin copolymers are disclosed in U.S. Pat. Nos. 5,206,075; 5,241,031; PCT International Publication Number WO 93/03093; PCT International Publication Number WO 90/03414; all four of which are herein incorporated, herein, in their entireties, by reference.

The terms "homogeneous" and "homogeneously-branched" are used in reference to an ethylene/α-olefin polymer (or interpolymer), in which the comonomer(s) is randomly distributed within a given polymer molecule, and substantially all of the polymer molecules have the same ethylene-to-comonomer(s) ratio. The homogeneously branched ethylene interpolymers include linear ethylene interpolymers, and substantially linear ethylene interpolymers.

Included amongst the homogeneously branched linear ethylene interpolymers are ethylene interpolymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes, as described, for example, by Elston in U.S. Pat. No. 3,645,992.

Substantially linear ethylene interpolymers used in the present invention are described in U.S. Pat. Nos. 5,272,236 and 5,278,272; the entire contents of each are herein. As discussed above, the substantially linear ethylene interpolymers are those in which the comonomer is randomly distributed within a given interpolymer molecule, and in which substantially all of the interpolymer molecules have the same ethylene/comonomer ratio within that interpolymer. Substantially linear ethylene interpolymers are prepared using a constrained geometry catalyst. Examples of constrained geometry catalysts, and such preparations, are described in U.S. Pat. Nos. 5,272,236 and 5,278,272.

In addition, the substantially linear ethylene interpolymers are homogeneously branched ethylene polymers having long chain branching. The long chain branches have about the same comonomer distribution as the polymer backbone, and can have about the same length as the length of the polymer backbone. As discussed above, "substantially linear," typically, is in reference to a polymer that is substituted, on average, with 0.01 long chain branches per 1000 total carbons (including both backbone and branch carbons) to 3 long chain branches per 1000 total carbons. Commercial examples of substantially linear polymers include ENGAGE™ polymers (The Dow Chemical Company), and AFFINITY™ polymers (The Dow Chemical Company).

In certain embodiments, the ethylene/α-olefin interpolymers have a molecular weight distribution (Mw/Mn) from 1 to 5, from 1.5 to 4, or from 2 to 3. All individual values and subranges from 1 to 5 are included herein and disclosed herein.

In certain embodiments, the ethylene/α-olefin interpolymers have a density greater than, or equal to 0.850 g/cc, greater than, or equal to, 0.855 g/cc, or greater than, or equal to 0.860 g/cc in accordance with ASTM D792 or ISO 1183-187.

In certain embodiments, the ethylene/α-olefin interpolymers have a density less than, or equal to, 0.910 g/cc, less than, or equal to, 0.900 g/cc, or less than, or equal to, 0.880 g/cc in accordance with ASTM D792 or ISO 1183-187.

In certain embodiments, the ethylene/α-olefin interpolymers have a density from 0.850 to 0.910 g/cc, from 0.850 to 0.880 g/cc, or from 0.860 to 0.880 g/cc in accordance with ASTM D792 or ISO 1183-187. All individual values and subranges from 0.850 to 0.910 g/cc are included herein and disclosed herein.

In certain embodiments, the ethylene/α-olefin interpolymers have in accordance with ASTM D1238 or ISO 1133, a melt index, $I_2$ (190° C./2.16 kg) greater than, or equal to, 0.05 g/10 min, greater than, or equal to, 0.1 g/10 min, or greater than, or equal to 0.2 g/10 min.

In certain embodiments, the ethylene/α-olefin interpolymer have, in accordance with ASTM D1238 or ISO 1133, a melt index, $I_2$ (190° C./2.16 kg), less than or equal to 50 g/10 min, less than or equal to 25 g/10 min, less than or equal to 10 g/10 min, less than or equal to 5 g/10 min, and/or less than or equal to 2 g/10 min.

In certain embodiments, the ethylene/α-olefin interpolymers have in accordance with ASTM D1238 or ISO 1133, a melt index, $I_2$ (190° C./2.16 kg) from 0.05 to 50 g/10 min, from 0.1 to 25 g/10 min, and/or from 0.2 to 10 g/10 min. All individual values and subranges from 0.05 to 50 g/10 min are included herein and disclosed herein.

In certain embodiments, the ethylene/α-olefin interpolymers have a number average molecular weight, (Mn) from 40,000 g/mole to 200,000 g/mole, from 50,000 g/mole to 150,000 g/mole, or from 60,000 g/mole to 100,000 g/mole. All individual values and subranges from 40,000 g/mole to 200,000 g/mole are included herein and disclosed herein.

In certain embodiments, the ethylene/α-olefin interpolymers have a weight average molecular weight, (Mw) from 80,000 g/mole to 400,000 g/mole, from 100,000 g/mole to 300,000 g/mole, or from 120,000 g/mole to 200,000 g/mole. All individual values and subranges from 80,000 g/mole to 400,000 g/mole are included herein and disclosed herein.

In certain embodiments, the ethylene/α-olefin interpolymers have a Tg less than −30° C., less than −40° C., and or less than −50° C.

The ethylene/α-olefin interpolymers of the present disclosure may be produced by any process or means known by one of ordinary skill in the art.

In certain embodiments, the TPE component may comprise more than one ethylene/α-olefin block interpolymer or ethylene/α-olefin multi block interpolymer as described herein.

In certain embodiments, the thermoplastic polyolefin elastomer component includes an ethylene/α-olefin multi block interpolymer, as described below.

Ethylene/Alpha-Olefin Multi Block Interpolymer

In certain embodiments, the at least one thermoplastic polyolefin elastomer is an ethylene/alpha-olefin multi-block interpolymer. The term "olefin block copolymer" or "OBC" means (and is interchangeable with) an "ethylene/α-olefin multi-block interpolymer" and includes ethylene and one or more copolymerizable α-olefin comonomer in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the interpolymer, it is understood that this means polymerized units thereof. In some embodiments, the ethylene/α-olefin interpolymer is an ethylene/α-olefin multi-block interpolymer. In some embodiments, the ethylene/α-olefin multi-block copolymer can be represented by the following formula:

$$(AB)_n,$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

AAA-AA-BBB-BB.

Ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms, or 4 or more carbon atoms. In some embodiments, the ethylene/α-olefin multi-block copolymer may comprise 50 mol % to 90 mol % ethylene, or 60 mol % to 85 mol % ethylene, or 65 mol % to 80 mol % ethylene. For many ethylene/octene multi-block copolymers, the composition comprises an ethylene content greater than 80 mole percent of the whole polymer and an octene content of from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Interpolymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer may have a polydispersity index (Mw/Mn) from 1.7 to 3.5, or from 1.8 to 3, or from 1.8 to 2.8, or from 2.4 to 2.8.

In a further embodiment, the ethylene/α-olefin multi-block copolymer is defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\ )H) + 62.81 \text{ for } \Delta H \text{ greater than zero and up to 130 J/g}$$

$$\Delta T \geq 48^\circ \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3.

It is understood that the ethylene/α-olefin multi-block interpolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

The olefin block copolymers can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and U.S. Pat. No. 7,947,793. Further exemplary catalytic processes include those disclosed in U.S. Pat. No. 8,785,554, which is herein incorporated by reference.

In certain embodiments, the ethylene/α-olefin multi-block interpolymer has a density greater than 0.850 g/cc, further greater than 0.860 g/cc, and further greater than 0.865 g/cc. The density may be, for example, from 0.850 g/cc to 0.910 g/cc, from 0.860 g/cc to 0.905 g/cc, and from 0.860 to 0.900 g/cc. Density is measured by the procedure of ASTM D-792 or ISO 1183.

In certain embodiments, the ethylene/α-olefin multi-block interpolymer, and further copolymer, has a melting point of greater than 90° C., further greater than 100° C. The melting point is measured by Differential Scanning calorimetry (DSC) method described in U.S. Publication 2006/0199930 (WO 2005/090427), incorporated herein by reference.

In certain embodiments, the ethylene/α-olefin multi-block interpolymer, and further copolymer, has a melt index ($I_2$) greater than, or equal to, 0.1 g/10 min, and further greater than, or equal to, 0.5 g/10 min, and less than, or equal to, 50 g/10 min, further less than, or equal to, 20 g/10 min, and further less than, or equal to, 10 g/10 min, as determined using ASTM D-1238 or ISO 1133 (190° C., 2.16 kg load).

Composition

In embodiments herein, the composition has a high load melt index ($I_{21}$) from 0.1 to 40 g/10 min. All individual values and subranges from 0.1 to 40 g/10 min are included and disclosed herein. For example, in some embodiments, the composition has a high load melt index ($I_{21}$) from 0.1 to 20 g/10 min. In other embodiments, the composition has a high load melt index ($I_{21}$) from 0.3 to 18 g/10 min. In further embodiments, the composition has a high load melt index ($I_{21}$) from 0.5 to 15 g/10 min.

In addition to the high load melt index, the composition may further have a density in the range of 0.890-0.930 g/cc (or 0.890-0.926 g/cc), a weight average molecular weight, Mw, of from 250,000 to 2,000,000 g/mole (or 400,000 to 1,600,000 g/mole), a molecular weight distribution (ratio of weight average molecular weight to number average molecular weight, Mw/Mn) of 7 to 40 (or 10 to 30), and/or a $Eta^{0.1}$ of 75,000 to 3,500,000 Pa-sec (or 100,000-3,000,000 Pa-sec).

In embodiments herein, the compositions may exhibit a % mass loss as measured according to the sand slurry test of less than 3.5%.

The compositions described herein may contain one or more optional additives. Additives include, but are not limited to, processing aids, acid neutralizers, UV stabilizers, hydro peroxide decomposers, alkyl radical scavengers, hindered amine stabilizers, multifunctional stabilizers, phosphites, antioxidants, process stabilizers, metal de-activators, additives to improve oxidative or chlorine resistance, pigments or colorants, nucleating agents, fatty acid stearates, fluoroelastomers, fillers, and combinations thereof.

In embodiments herein, the compositions may contain one or more processing aids. In some embodiments, the processing aid may comprise one or more fluoropolymers. Without being bound by theory, it is believed that the inclusion of one or more fluoropolymers in the compositions described herein improves processability of the composition, by lowering the apparent melt viscosity of the composition to reduce build up at an extrusion die. Additionally, the inclusion of one or more fluoropolymers in the compositions described herein does not adversely affect the mechanical properties of the compositions. Suitable fluoropolymers may include, but are not limited to, vinylidene fluoride, hexafluoropropylene, chlorotrifluoroethylene, tetrafluoroethylene, perfluoroalkyl perfluorovinyl ethers, 1-hydropentafluoropropylene, 2-hydropentafluoropropylene, and combinations thereof. Other examples of suitable fluoropolymers may include, but are not limited to, copolymers of vinylidene fluoride and one or more comonomers selected from hexafluoropropylene, chlorotrifluoroethylene, 1-hydropentafluoropropylene, and 2-hydropentafluoropropylene. Further examples of suitable fluoropolymers may include, but are not limited to, copolymers of tetrafluoroethylene and one or more comonomers selected from hexafluoropropylene and vinylidene fluoride. In some examples, the fluoropolymers may further be blended with olefins, such as, for example, propylene, or a polyether, such as for example, polyethylene oxide. In some embodiments, the fluoropolymer is selected from the group consisting of vinylidene fluoride/hexafluoropropylene, vinylidene fluoride/hexafluoropropylene/tetrafluoroethylene, tetrafluoroethylene, tetrafluoroethylene/propylene, tetrafluoroethylene/propylene/vinylidene fluoride, or vinylidene fluoride/hexafluoropropylene/polyethylene oxide. In other embodiments, the fluoropolymer is selected from the group consisting of vinylidene fluoride/hexafluoropropylene, vinylidene fluoride/hexafluoropropylene/tetrafluoroethylene, tetrafluoroethylene/propylene/vinylidene fluoride, or vinylidene fluoride/hexafluoropropylene/polyethylene oxide. In further embodiments, the fluoropolymer is vinylidene fluoride/hexafluoropropylene/tetrafluoroethylene.

The fluoropolymer described herein may also be characterized by one or more properties. In some embodiments, the fluoropolymers employed in the compositions described herein may have a melting point of 100 to 135° C., as measured by the differential scanning calorimetry (DSC) according to ASTM D4591-07. In some embodiments, the fluoropolymers employed in the compositions described herein may have a density of 1.80 to 2.20 g/cc. The density may be determined according to ASTM D792. In some embodiments, the fluoropolymers employed in the compositions described herein may have a melt flow index (265° C.; 5 kg) of 2.0 to 20.0 g/10 min. The melt flow index (MFI) may be determined according to ASTM D1238 at 265° C., 5.0 kg. The one or more fluoropolymers may be employed in the compositions such that the total fluoropolymer level is from 50 to 5000 ppm, from 100 to 3000, from 150 to 2000, or from 250 to 1000 ppm. Without being bound by theory, it is believed that incorporation of one or more fluoropolymers into the compositions described herein can contribute to more homogenized blends during compounding and also to better abrasion resistant properties by reducing the coefficient of friction at the surface of the compositions described herein.

The compositions described herein may be manufactured by any suitable mixing means known in the art, including melt or dry/physical blending of the individual components. It should be understood that other suitable methods for blending the components together may be utilized. In some embodiments herein, the components may be blended under high shear conditions. For example, the components may be blended at a shear rate of greater than or equal to 5/sec, greater than or equal to 10/sec, greater than or equal to 20/sec, or greater than or equal to 50/sec. In other embodiments, the components may be blended at a shear rate of greater than or equal to 5/sec to less than or equal to 1000/sec. All individual values and subranges of greater than or equal to 5/sec and less than or equal to 1000/sec are included and disclosed herein. It should be understood that various shear rate combinations (e.g., a shear rate of 5/sec for a period of time, then change to a shear rate of 50/sec for a period of time) may also be used.

The compositions described herein can be used to manufacture a shaped article, or one or more components of a shaped article. Such articles may be single-layer or multilayer articles, which may be obtained by suitable known conversion techniques, applying heat, pressure, or a combination thereof, to obtain the desired article. Examples of suitable conversion techniques may include, for example, blow-molding, co-extrusion blow-molding, injection molding, injection stretch blow molding, compression molding, extrusion, pultrusion, calendering and thermoforming. Shaped articles may include, for example, pipes, pipe liners, pipe coatings (for example, steel pipe coatings), blow molded articles, injection molded articles, compression molded articles, drip tapes and tubing, films, sheets, fibers, profiles and moldings.

In some embodiments, the compositions described herein may be particularly well-suited for use in manufacturing durable pipes. Pipes can include monolayer pipes, as well as multilayer pipes, including multilayer composite pipes. Pipes formed from the compositions described herein may also contain a suitable combination of additives and/or fillers designed for pipe applications. In other embodiments, the compositions described herein may be well-suited for use in manufacturing a pipe liner.

The embodiments described herein may be further illustrated by the following non-limiting examples.

TEST METHODS

Unless otherwise stated, the following test methods are used.

Density

Density for ethylene-based polymers is determined according to ASTM D792.

Melt Index

Melt index, or $I_2$, for ethylene-based polymers is determined according to ASTM D1238 at 190° C., 2.16 kg. High load melt index, or $I_{21}$, for ethylene-based polymers is determined according to ASTM D1238 at 190° C., 21.6 kg.

Gel Permeation Chromatography

The chromatographic system consisted of a PolymerChar GPC-IR (Valencia, Spain) high temperature GPC chromatograph equipped with a 4-capillary differential viscometer detector and a IR5 multi-fixed wavelength infra-red detector. A Precision Detectors (Agilent) 2-angle laser light scattering detector Model 2040 was added to the system. The 15-degree angle of the light scattering detector was used for calculation purposes. Data collection was performed using "GPC One" software from PolymerChar. The system was equipped with an on-line solvent degas device from Agilent.

Both the carousel compartment and the column compartment were operated at 150° C. The columns used were 4 Agilent "Mixed A" 30 cm 20-micron columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

For conventional molecular weight measurements, the GPC column set was calibrated with at least 20 narrow molecular weight distribution polystyrene standards (Agilent) with molecular weights ranging from 580 to 8,400,000 and were arranged in 6 "cocktail" mixtures with at least a decade of separation between individual molecular weight components. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using the following equation (as described in *Williams and Ward, J. Polym. Sci., Polym. Let.*, 6, 621 (1968)):

$$M_{polyethylene}=A\times(M_{polystyrene})^B$$

where M is the molecular weight, A has a value of approximately 0.41 for conventional GPC and triple detector backbone MW calculations (referencing an A value that yields an Mw of 52,000 for SRM NBS1475) and B is equal to 1.0. A third-order polynomial was used to fit the respective polyethylene-equivalent calibration points. Data calculations were performed using "GPC One" software from PolymerChar.

Dynamic Mechanical Spectroscopy (DMS)

Resins are compression-molded into "25×3 mm" circular plaques at 190° C., for six and a half minutes, under 20,000 lbs., in air. The sample is then taken out of the press, and placed on a counter to cool.

A constant temperature frequency sweep is performed using a TA Instruments "Advanced Rheometric Expansion System (ARES)," equipped with 25 mm (diameter) parallel plates, under a nitrogen purge. The sample is placed on the plate, and allowed to melt for five minutes at 190° C. The plates are then closed to a gap of "2 mm," the sample trimmed (extra sample that extends beyond the circumference of the "25 mm diameter" plate is removed), and then the test is started. The method has an additional five minute delay built in, to allow for temperature equilibrium. The experiments are performed at 190° C. over a frequency range of 0.1 to 100 rad/s. The strain amplitude is constant at 10%. The viscosity at 0.1 rad/s ($Eta^{0.1}$) may be calculated from this data and is reported in Pa-sec.

Abrasion Resistance Test (Sand Slurry Test)

A Sand Slurry Test Rig, similar to that described in ISO-15527, was used for abrasion resistance test. The test rig was 11 inches deep by 9 inches in internal diameter. The test rig contained 10.2 kilograms of 16 grit aluminum oxide (Alox 16) and 6.2 kilograms of water, which filled the bottom 8 inches of the vessel. A 6 in L×6 in W×10 mm thick compression molded plaque is cut into test coupons with dimension of 3.875 inch L×1.25 inch W×10 mm thick. A test coupon was attached to the bottom of a 10 inch long drive shaft that rotated the test coupon 2 inches above the bottom of the test rig at about 1,500 rpm. A minimum of 3 samples each were tested for 90 mins at room temperature at 1,500 rpm. The test produced significant, but reproducible mass loss on the test coupons. For each test, fresh grit and water were used. The weight of each test coupon was measured before and after the abrasion test. The following calculations were made: Weight Loss for Each Test Coupon, g=[Before Abrasion Weight, g]−[After Abrasion Weight, g]; Average Weight Loss=[ΣWeight Loss for Each Test Coupon, g]/[Number of Measurements]; % Weight Loss for Each Test Coupon=[Weight Loss for Each Test Coupon (g)/Before Abrasion Weight (g)]×100%; Average % Weight Loss=[Σ% Weight Loss]/[Number of Measurements]. The endpoints of the Range of Loss were selected from the lowest and highest Weight Loss values.

EXAMPLES

The following compositions are used in the Examples described below.

Inventive Example 1

An ultra-high molecular weight ethylene-based polymer having a weight average molecular weight of 8,000,000 g/mole, a density of 0.925 g/cc, an intrinsic viscosity of 28 dL/g, and an average particle size, D50, of 150 μm (UTEC™ 6541, available from Braskem, Brazil), a polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA), and a thermoplastic polyolefin elastomer (INFUSE™ 9010, density=0.877 g/cc, melt index $I_2$=0.5 g/10 min, Mw/Mn of 2.6, available from The Dow Chemical Company, USA) were blended at a 50:15:35 weight ratio to form a composition. The composition was compounded with 600 ppm of a fluoropolymer process aid that has a melt flow index (265° C., 5 Kg) of 10 g/10 minutes (Dynamar FX5911, available from 3M, Inc., USA), using a LabTech 26 mm twin screw compounder, at the following processing parameters to produce uniform pellets:

Barrel Temperatures: 275° C. flat temperature profile

Die Temperatures: 280° C. flat temperature profile

Screw RPM: 130; Torque: 80%; Melt Temperature: 280° C.

The properties of the composition (pellets) are shown below in Table 1. The composition was compression molded into 6"×6" plaques (10 mm thick), and then cut into 3.875"×1.25" test coupons for abrasion testing. The details of the compression molding procedure are described in ASTM D4703.

Inventive Example 2

An ultra-high molecular weight ethylene-based polymer having a weight average molecular weight of 8,000,000 g/mole, a density of 0.925 g/cc, an intrinsic viscosity of 28 dL/g, and an average particle size, D50, of 150 μm (UTEC™ 6541, available from Braskem, Brazil), a polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA), and a thermoplastic polyolefin elastomer (ENGAGE™ 7387, density=0.870 g/cc, melt index $I_2$=0.5 g/10 min, available from The Dow Chemical Company, USA) were blended at a 50:15:35 weight ratio to form a composition. The composition was compounded with 600 ppm of a fluoropolymer process aid that has a melt flow index (265° C., 5 Kg) of 10 g/10 minutes (Dynamar FX5911, available from 3M, Inc., USA), using a LabTech 26 mm twin screw compounder, at the following processing parameters to produce uniform pellets:

Barrel Temperatures: 275° C. flat temperature profile
Die Temperatures: 280° C. flat temperature profile
Screw RPM: 130; Torque: 80%; Melt Temperature: 280° C.

The properties of the composition (pellets) are shown below in Table 1. The composition was compression molded into 6"×6" plaques (10 mm thick), and then cut into 3.875"×1.25" test coupons for abrasion testing. The details of the compression molding procedure are described in ASTM D4703.

Inventive Example 3

An ultra-high molecular weight ethylene-based polymer having a weight average molecular weight of 8,000,000 g/mole, a density of 0.925 g/cc, an intrinsic viscosity of 28 dL/g, and an average particle size, D50, of 150 μm (UTEC™ 6541, available from Braskem, Brazil), a polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA), and a thermoplastic polyolefin elastomer (INFUSE™ 9010, density=0.877 g/cc, melt index $I_2$=0.5 g/10 min, available from The Dow Chemical Company, USA) were blended at a 50:30:20 weight ratio to form a composition. The composition was compounded with 600 ppm of a fluoropolymer process aid that has a melt flow index (265° C., 5 Kg) of 10 g/10 minutes (Dynamar FX5911, available from 3M, Inc., USA), using a LabTech 26 mm twin screw compounder, at the following processing parameters to produce uniform pellets:

Barrel Temperatures: 275° C. flat temperature profile
Die Temperatures: 280° C. flat temperature profile
Screw RPM: 130; Torque: 80%; Melt Temperature: 280° C.

The properties of the composition (pellets) are shown below in Table 1. The composition was compression molded into 6"×6" plaques (10 mm thick), and then cut into 3.875"×1.25" test coupons for abrasion testing. The details of the compression molding procedure are described in ASTM D4703.

Inventive Example 4

An ultra-high molecular weight ethylene-based polymer having a weight average molecular weight of 8,000,000 g/mole, a density of 0.925 g/cc, an intrinsic viscosity of 28 dL/g, and an average particle size, D50, of 150 μm (UTEC™ 6541, available from Braskem, Brazil), a polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA), and a thermoplastic polyolefin elastomer (INFUSE™ 9010, density=0.877 g/cc, melt index $I_2$=0.5 g/10 min, available from The Dow Chemical Company, USA) were blended at a 35:30:35 weight ratio to form a composition. The composition was compounded with 600 ppm of a fluoropolymer process aid that has a melt flow index (265° C., 5 Kg) of 10 g/10 minutes (Dynamar FX5911, available from 3M, Inc., USA), using a LabTech 26 mm twin screw compounder, at the following processing parameters to produce uniform pellets:

Barrel Temperatures: 275° C. flat temperature profile
Die Temperatures: 280° C. flat temperature profile
Screw RPM: 130; Torque: 80%; Melt Temperature: 280° C.

The properties of the composition (pellets) are shown below in Table 1. The composition was compression molded into 6"×6" plaques (10 mm thick), and then cut into 3.875"×1.25" test coupons for abrasion testing. The details of the compression molding procedure are described in ASTM D4703.

Inventive Example 5

An ultra-high molecular weight ethylene-based polymer having a weight average molecular weight of 8,000,000 g/mole, a density of 0.925 g/cc, an intrinsic viscosity of 28 dL/g, and an average particle size, D50, of 150 μm (UTEC™ 6541, available from Braskem, Brazil), a polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA), and a thermoplastic polyolefin elastomer (ENGAGE™ 7280, density=0.884 g/cc, melt index $I_2$=0.5 g/10 min, available from The Dow Chemical Company, USA) were blended at a 50:15:35 weight ratio to form a composition. The composition was compounded with 600 ppm of a fluoropolymer process aid that has a melt flow index (265° C., 5 Kg) of 10 g/10 minutes (Dynamar FX5911, available from 3M, Inc., USA), using a LabTech 26 mm twin screw, at the following processing parameters to produce uniform pellets:

Barrel Temperatures: 275° C. flat temperature profile
Die Temperatures: 280° C. flat temperature profile
Screw RPM: 130; Torque: 80%; Melt Temperature: 280° C.

The properties of the composition (pellets) are shown below in Table 1. The composition was compression molded into 6"×6" plaques (10 mm thick), and then cut into 3.875"×1.25" test coupons for abrasion testing. The details of the compression molding procedure are described in ASTM D4703.

TABLE 1

| Composition Properties | | | | |
|---|---|---|---|---|
| | Density (g/cc) | Mw (g/mole) | MWD (or Mw/Mn) | $Eta^{0.1}$ (Pa-sec) |
| Inventive Example 1 | 0.9151 | — | — | 582,982 |
| Inventive Example 2 | 0.9107 | 774,807 | 12.13 | — |
| Inventive Example 3 | 0.9246 | 1,418,392 | 29.23 | 892,555 |
| Inventive Example 4 | 0.9171 | 822,595 | 18.76 | 192,021 |
| Inventive Example 5 | 0.9172 | 853,062 | 15.53 | — |

COMPARATIVE EXAMPLES

Comparative Example 1

A polyethylene resin comprising a first molecular weight ethylene-based polymer component and a second molecular weight ethylene-based polymer component having a melt index, $I_2$, of 0.07 g/10 min, and a density of 0.949 g/cc (DGDA 2490 NT, available from the Dow Chemical Company, USA). The polyethylene resin was compression molded per ASTM D4703 into 6"×6" plaques (10 mm thick) and then cut into 3.875"×1.25" test coupons for abrasion testing.

Comparative Example 2

An ultra-high molecular weight polyethylene having a weight average molecular weight of 8,000,000, a density of 0.925 g/cc, and an intrinsic viscosity of 28 dL/g (UTEC™ 6541, available from Braskem, Brazil). The ultra-high molecular weight polyethylene was compression molded per ASTM D4703 into 6"×6" plaques (10 mm thick) and then cut into 3.875"×1.25" test coupons.

Comparative Example 3

An ultra-high molecular weight ethylene-based polymer having a weight average molecular weight of 8,000,000 g/mole, a density of 0.925 g/cc, an intrinsic viscosity of 28 dL/g, and an average particle size, D50, of 150 μm (UTEC™ 6541, available from Braskem, Brazil), a polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA) were blended at a 60:40 weight ratio to form a blend. The blend was compounded with 600 ppm of a fluoropolymer process aid that has a melt flow index (265° C., 5 Kg) of 10 g/10 minutes (Dynamar FX5911, available from 3M, Inc., USA), using a LabTech 26 mm twin screw, at the following processing parameters to produce uniform pellets:

Barrel Temperatures: 275° C. flat temperature profile

Die Temperatures: 280° C. flat temperature profile

Screw RPM: 130; Torque: 80%; Melt Temperature: 280° C.

The composition was compression molded into 6"×6" plaques (10 mm thick), and then cut into 3.875"×1.25" test coupons for abrasion testing. The details of the compression molding procedure are described in ASTM D4703.

TABLE 2

Abrasion Resistance & HLMI (or $I_{21}$) Test Results

| Material | HLMI or $I_{21}$ (g/10 minutes) | Loss Properties @ Room Temperature in Water Average Weight Loss (%) |
|---|---|---|
| Inventive Example 1 | 6.50 | 1.61% |
| Inventive Example 2 | 6.50 | 1.26% |
| Inventive Example 3 | 3.93 | 2.47% |
| Inventive Example 4 | 14.83 | 1.88% |
| Inventive Example 5 | 6.50 | 1.83% |
| Comparative Example 1 | 7.0 | 7.04% |
| Comparative Example 2 | 0.0 | 2.31% |
| Comparative Example 3 | 0.08 | 3.30% |

As shown in Table 2, the Inventive Examples exhibit a higher abrasion resistance (i.e., a lower average weight loss %) when compared to Comparative Example 1, which is a polyethylene resin alone, and does not lose a significant amount of abrasion resistance when compared to Comparative Examples 2 and 3. In addition, the HLMI for the Inventive Examples, when compared to that of both Comparative Examples 2 and 3, respectively, show improved processability due to the higher HLMI value.

We claim:

1. A pipe or pipe liner formed from a composition, the composition comprising:

a. from 30 to 60 wt. % of an ultra-high molecular weight ethylene-based polymer having an intrinsic viscosity from 5 to 50 deciliters/gram, b. from 10 to 40 wt. % of a polyethylene resin comprising a first molecular weight ethylene-based polymer component and a second molecular weight ethylene-based polymer component, wherein the polyethylene resin has a density from 0.930 to 0.960 g/cc;

c. from 10 to 40 wt. % of a thermoplastic polyolefin elastomer having a density of from 0.850 to 0.910 g/cc, and d. optionally, a fluoropolymer;

wherein the amounts of ultra-high molecular weight ethylene-based polymer, polyethylene resin, and thermoplastic polyolefin elastomer add up to 100 wt. %, and wherein the composition exhibits an abrasion resistance, as measured according to the Sand Slurry Test, of less than 2.75%.

2. The pipe or pipe liner of claim 1, wherein the ultra-high molecular weight ethylene-based polymer has a density of from 0.915 to 0.950 g/cc.

3. The pipe or pipe liner of claim 1, wherein the ultra-high molecular weight ethylene-based polymer has a weight average molecular weight of greater than 1,000,000 g/mole.

4. The pipe or pipe liner of claim 1, wherein the polyethylene resin has a melt index ($I_2$) from 0.03-2.0 g/10 min.

5. The pipe or pipe liner of claim 1, wherein the polyethylene resin has a high load melt index ($I_{21}$) from 1 to 20 g/10 min.

6. The pipe or pipe liner of claim 1, wherein the first molecular weight ethylene-based polymer component has a density of from 0.910 to 0.940 g/cc.

7. The pipe or pipe liner of claim 1, wherein the first molecular weight ethylene-based polymer component has a high load melt index ($I_{21}$) of from 0.05 to 1.2 g/10 min.

8. The pipe or pipe liner of claim 1, wherein the composition has a high load melt index ($I_{21}$) from 0.1 to 40 g/10 min.

9. The pipe or pipe liner of claim 1, wherein the composition has a high load melt index ($I_{21}$) from 0.1 to 20 g/10 min.

10. The pipe or pipe liner of claim 1, wherein the thermoplastic polyolefin elastomer is selected from the group consisting of ethylene/alpha-olefin interpolymers, ethylene/alpha-olefin multi-block interpolymers, and combinations thereof.

11. The pipe or pipe liner of claim 1, wherein the composition comprises a fluoropolymer that has a melt flow index (265° C.; 5.0 kg) from 2.0 to 20.0 g/10 min.

12. The pipe or pipe liner of claim 1, wherein the composition comprises a fluoropolymer that is present in an amount from 50 to 5000 ppm, based on the weight of the composition.

* * * * *